United States Patent [19]

Le Dieu et al.

[11] 4,352,181
[45] Sep. 28, 1982

[54] DEVICE FOR SYNCHRONISING MULTIPLEX LINES IN A TIME-DIVISION EXCHANGE

[75] Inventors: Bernard Le Dieu, Perros Guirec; Jean-René Hérledan, Lannion, both of France

[73] Assignee: Compagnie Industrielle des Telecommunications CIT-ALCATEL, Paris, France

[21] Appl. No.: 146,852

[22] Filed: May 5, 1980

[30] Foreign Application Priority Data

May 3, 1979 [FR] France .............................. 79 11094

[51] Int. Cl.³ .............................................. H04J 3/06
[52] U.S. Cl. .................................. 370/105; 370/108; 375/106
[58] Field of Search ....................... 370/100, 105, 108; 375/106

[56] References Cited

U.S. PATENT DOCUMENTS

| | | | |
|---|---|---|---|
| 3,928,727 | 12/1975 | Roche | 370/100 |
| 4,076,964 | 2/1978 | Henrion et al. | 370/100 |
| 4,086,437 | 4/1978 | Henrion et al. | 370/102 |
| 4,158,108 | 6/1979 | Le Pabic et al. | 370/102 |

Primary Examiner—Marc E. Bookbinder
Attorney, Agent, or Firm—Sughrue, Mion, Zinn, Macpeak & Seas

[57] ABSTRACT

A device for synchronizing multiplex lines in a time-division exchange comprising an input register, local and distant counters, a memory with a capacity of two frames, a frame alignment word detector, a write time select circuit, a decision circuit providing a frame skip or frame repetition facility for memory read operations, a circuit for addressing the memory in write and read modes and an odd parity injection circuit.

6 Claims, 5 Drawing Figures

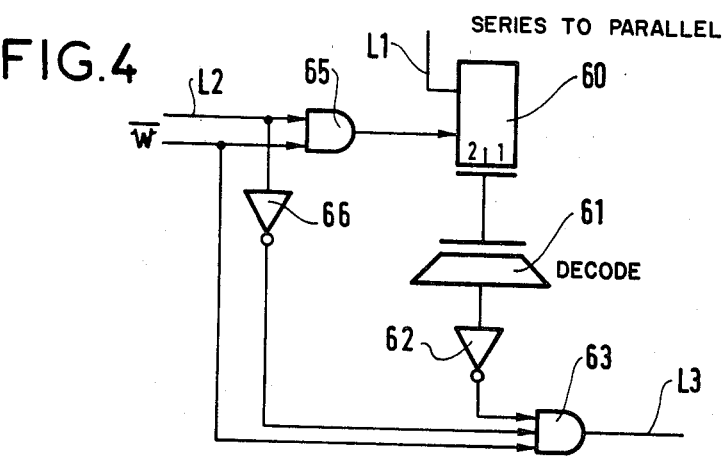
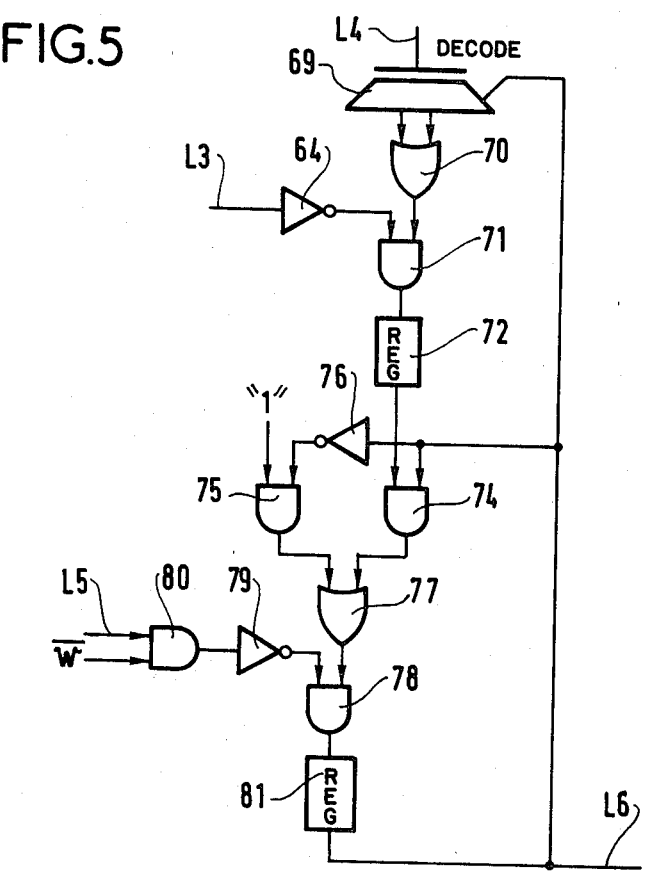

4,352,181

DEVICE FOR SYNCHRONISING MULTIPLEX LINES IN A TIME-DIVISION EXCHANGE

BACKGROUND OF THE INVENTION

The invention is concerned with synchronising the multiplex lines which connect a time-division exchange to other time-division or electromechanical exchanges or to line concentrators connected to a number of subscribers. A time-division exchange transmits speech and non-speech signals using pulse code modulation. The signals are contained within the time slots of a frame carried by the multiplex lines. Each multiplex line connected to a time-division exchange provides a connection to an exchange or line concentrator with its own ("distant") clock. The time-division exchange has its own ("local") clock. As is well known, the distant and local clocks are not in phase, since they are not exactly synchronous. Multiplex lines are also subject to the phenomenon known as "jitter". Jitter is induced by the use of digital transmission and involves spurious modulation of the times at which the pulses are centred. For this reason, before a time-division exchange is able to process data from another exchange or line concentrator, the incoming data in phase with the distant clock $\overline{wd}$ must be resynchronised with the local clock $w$.

Synchronising devices are already known in the art, in particular that described in the article "Groupement d'équipement de synchronisation du systeme de commutation temporelle Platon" by D FEUERSTEIN, J B JACOB, R RENOULIN and J GUEZOU in the review "Commutation et Electronique" No 34, July 1971. Such known devices are complex and do not totally eliminate jitter when present to any significant extent.

SUMMARY OF THE INVENTION

The preferred embodiment of the present invention provides a synchronising device which is less complex than hitherto known devices and provides improved elimination of jitter. The invention consists of a synchronising device providing frame synchronisation of incoming multiplex signals and comprising an input register, local and distant counters, a memory with a capacity of 2 frames, a frame alignment word detector, a write time select circuit, a decision circuit providing for a frame skip or frame repetition on reading the memory, a memory addressing circuit for write and read operations and an odd parity injection circuit.

More precisely the present invention provides a device for synchronising multiplex lines in a time-division exchange, the multiplex lines conveying PCM encoded speech signals arranged in time slots grouped into frames, the device comprising:

a local counter with a counting capacity equal to the number of bits in a frame, controlled by a local clock signal;

a distant counter with a counting capacity equal to the number of bits of two distant frames, controlled by an inverted distant clock signal connected to the multiplex line;

an input register;

a parallel register connected to the output of the input register;

an output register;

a memory with a storage capacity of two distant frames with its input connected to the output of said parallel register through a write AND gate and its output connected to the output register through a read AND gate;

an addressing circuit for memory write and read operations, having its input connected to the local counter which outputs the read addresses and to the distant counter which outputs the write addresses, its output being connected to a memory addressing control input;

a write time select circuit with its input connected to the local counter and to the distant counter and its output connected to the memory addressing circuit and to said write AND gate;

a decision circuit for detecting any relative shift in the values output by the local and distant counters of less than a predetermined value, responding by imposing readout of the second frame in memory, said decision circuit having its input connected to the local counter to the distant counter and to the output of the write time select circuit, and its output connected to an input of the memory addressing circuit; and a frame alignment circuit for detecting and checking an identification code known as the multiplex frame alignment word and for initialising the distant counter on detection of the frame alignment word, having its input connected to the distant counter and the input register and its output connected to the input of the distant counter.

BRIEF DESCRIPTION OF THE DRAWINGS

The invention will now be described in more detail with reference to specific embodiments thereof as shown in the accompanying drawings, in which:

FIG. 4 shows a write time select circuit of FIG. 1, and FIG. 5 shows a decision circuit of FIG. 1.

DETAILED DESCRIPTION OF THE INVENTION

Figure 1:
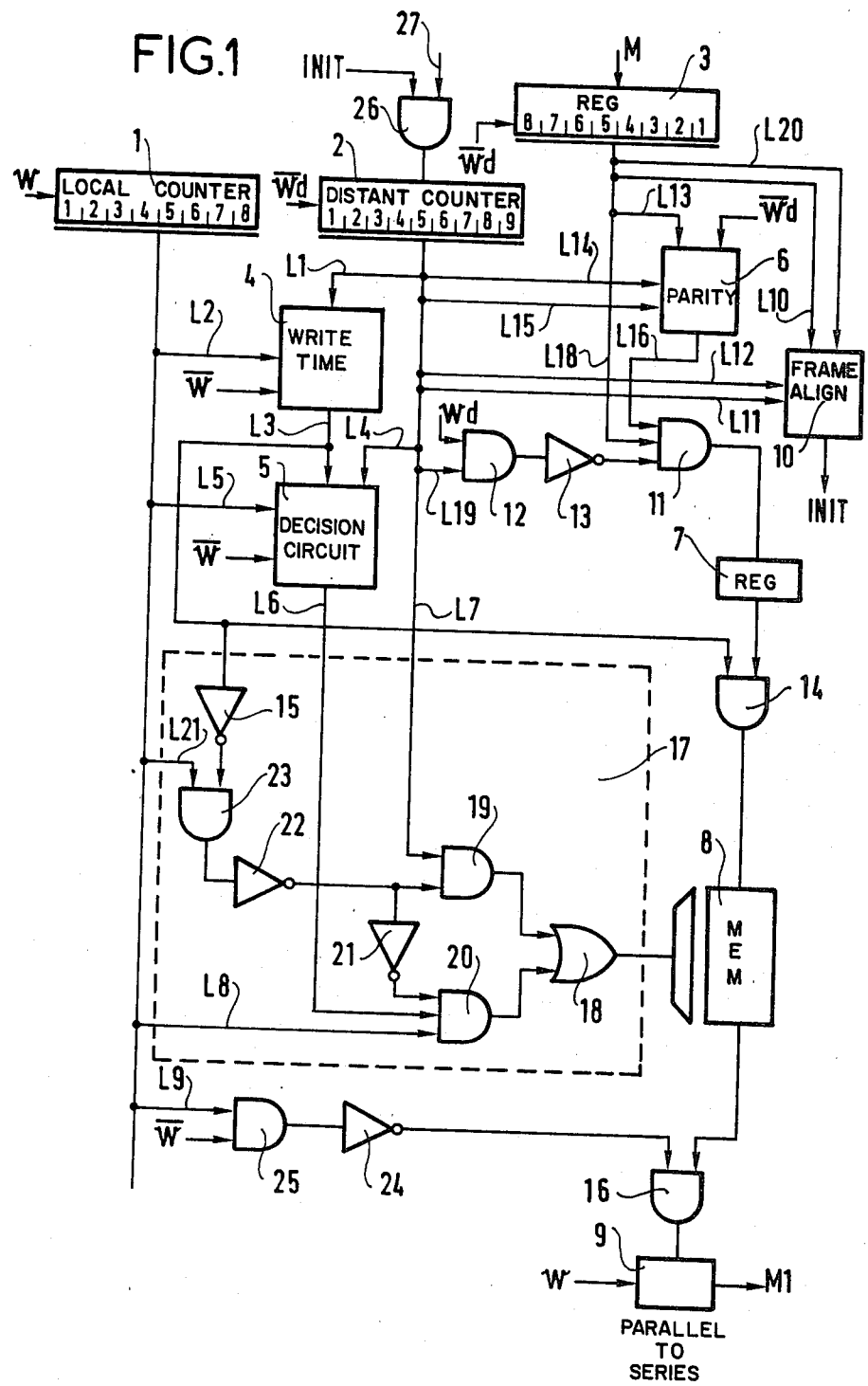
FIG. 1 is the block schematic of a synchronising device in accordance with the present invention.

FIG. 1 shows a synchronising device in accordance with the invention. A local counter 1 is advanced by a signal $w$ provided by the local clock $w$. A distant counter 2 is advanced by a signal $\overline{wd}$ provided by a code converter receiving the multiplex signal to be synchronised, the signal $\overline{wd}$ corresponding to the distant clock. An input register 3 receives the multiplex code M from the code converter and is advanced by the signal $\overline{wd}$. The synchronising device also includes a write time select circuit 4, a decision circuit 5 which enables a frame skip or frame repetition on reading the memory, an odd parity injection circuit 6, a 4-bit register 7, a memory 8 with a capacity of 128 words each of 4 bits, an addressing circuit 17, a 4-bit parallel/series output register 9 and a frame alignment word detector 10.

The local counter 1 is an 8-bit counter. The distant counter 2 is a 9-bit counter. The input register 3 is an 8-bit register.

Signals $\overline{w}$ and $\overline{wd}$ have a duration of 245 nanoseconds and a period of 490 nanoseconds. Multiplex line M has a 125 microsecond frame divided into 32 time slots each of 8 bits.

The write time select circuit receives signal $\overline{w}$ and has its input connected to bit 2 of distant counter 2 over link L1 and to bit 1 of local counter 1 over link L2. The write time select circuit outputs a signal on link L3.

Decision circuit 5 receives signal w and has its input connected to the output of write time select circuit 4, to bits 1-8 of local counter 1 over link L5 and to bits 5-9 of distant counter 2 over link L4. Decision circuit 5 outputs a signal over link L6.

Odd parity injection circuit 6 receives signal wd and has its input connected to bit 3 of input register 3 over link L13 and to bits 1-8 and bit 9 of distant counter 2 over links L14 and L15, respectively. The odd parity injection circuit outputs a signal over link L16.

Frame alignment word detector 10 has its input connected to bits 3-8 of input register 3 over link L10 and to bit 2 of register 3 over link L20, and also to bits 1-8 of distant counter 2 over link L11 and to bit 9 of counter 2 over link L12. The frame alignment word detector outputs a signal INIT which is used to initialise distant counter 2 to the 1 state through an AND gate 26 which is connected to a direct current source from which it receives a continuous signal on another input over link 27.

Register 7 has its input connected to the output of an AND gate 11 which has its input connected to bits 2, 4 and 5 of input register 3 over link L18, to the output of the odd parity injection circuit 6 over link L16 and to the output of an AND gate 12 through an inverter 13. AND gate 12 has its input connected to bits 1 and 2 of distant counter 2 over link L19 and receives signal wd. The output of register 7 is connected to one input of an AND gate 14 with another input connected to the output of write time select circuit 4 over link L3.

AND gate 11 receives over link L16 one bit from the odd parity injection circuit, which passes on bit 3 of the input register or generates a bit of value 0 or 1 to re-establish odd parity.

Memory 8 has its input connected to the output of AND gate 14 and its output connected to an input of an AND gate 16. The addressing input of memory 8 is connected to the output of addressing circuit 17.

Addressing circuit 17 includes an output OR gate 18 with one input connected to the output of an AND gate 19 and another input connected to the output of an AND gate 20. AND gate 19 has one input connected to bits 3-9 of distant counter 2 over link L7 and another input connected to an input of AND gate 20 through an inverter 21, and also through an inverter 22 to the output of an AND gate 23. AND gate 23 has one input connected through an inverter 15 to the output of write time select circuit 4 and another input connected to bit 1 of local counter 1 over link L21. AND gate 20 has another input connected to bits 3-8 of local counter 1 over link L8 and another input connected to the output of decision circuit 5 over link L6. Link L6 outputs a bit of value 0 for addressing the first half of memory 8 (words 0 to 63) and of value 1 for addressing the second half of memory 8 (words 64 to 127).

Output register 9 has its parallel input connected to the output of AND gate 16 which has another input connected through an inverter 24 to the output of an AND gate 25. One input of AND gate 25 is connected to bits 1 and 2 of local counter 1 over link L9 and the other input receives w. The output register 9 is advanced by signal $\overline{w}$. The output of register 9 is connected to a multiplex line M1 which carries the data from incoming multiplex line M (from input register 3), following synchronisation with the local time base.

While the outputs of circuit elements 11, 12, 14, 16, 18, 19, 20 and 23 are shown as comprising a single lead for the sake of simplicity, it can readily be seen that they comprise a plurality of lines, one for each bit. The associated logical elements which follow the above-mentioned elements similarly represent the equivalent logical function, such as the inversion function, upon the associated plurality of lines simultaneously. Thus, AND gate 12 passes two bits to inverter 13 which inverts them and passes the inverted bits to AND gate 11. A similar convention will be used in the remaining description and drawings.

Figures 2, 3:
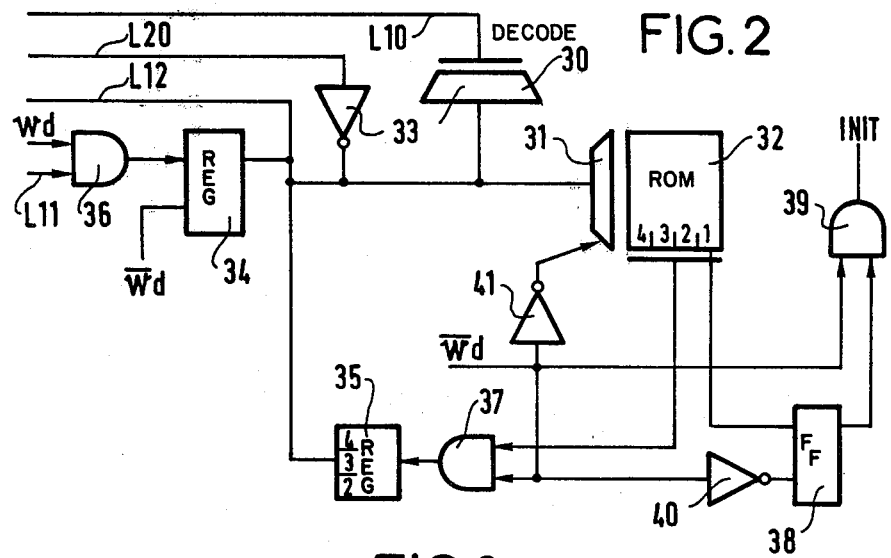
FIG. 2 shows a frame alignment word detector of FIG. 1 in more detail.
FIG. 3 shows an odd parity injection circuit of FIG. 1.

FIG. 2 shows the frame alignment word detector 10 of FIG. 1. An address decoder 30 has its input connected over link L10 to bits 3 to 8 of input register 3. The output of decoder 30 is connected to an addressing circuit 31 of a read only memory 32 with a capacity of 128 words each of 4 bits. The addressing circuit is also connected through an inverter 33 to link L20 connected to bit 2 of the input register, to link L12 which is connected to bit 9 of the distant counter, to the output of a unitary register 34 and to the output of a 3-bit register 35. Unitary register 34 is controlled by signal $\overline{wd}$ and is connected to the output of an AND gate 36, one input of which receives signal wd and the other input of which is connected over link L11 to bits 1 to 8 of the distant counter. The input of register 35 is connected to the output of an AND gate 37 which has one input connected to bits 2, 3 and 4 (most significant bits) of the read only memory 32 and another input connected to receive signal $\overline{wd}$. A flip flop 38 is controlled by signal $\overline{wd}$ through an inverter 40 and by the least significant bit (bit 1) at the output of read only memory 32. The output of flip flop 38 is connected to one input of an AND gate 39 which has another input connected to receive signal $\overline{wd}$. The output of AND gate 39 provides the initialisation signal INIT which initialises the distant counter. The addressing circuit 31 has one addressing input receiving signal $\overline{wd}$ through an inverter 41.

Read only memory 32 is divided into eight sectors each of 16 words each of 4 bits. A first sector relates to the aligned state. A second sector relates to the aligned state with one frame alignment word missing. A third sector relates to the aligned state with two consecutive frame alignment words missing. A fourth sector relates to loss of frame alignment. A fifth sector relates to re-alignment subject to confirmation. A sixth sector relates to confirmed re-alignment. A seventh sector relates to unconfirmed re-alignment. The eighth sector is not used. At the output of read only memory 32, bit 1 is used to initialise distant counter 2 and bits 2, 3 and 4 are written into register 35 and used for subsequent memory addressing. Assuming that the initial state is out of alignment (sector four), the contents of ROM 32 are predefined so that the fourth sector is subsequently addressed by the output of register 35 whose bits 2, 3 and 4 have the values 0, 0, 1 defining the fourth sector. The fourth sector will be addressed until decoder 30 and inverter 33 output a signal of value 1, corresponding to a recognised frame alignment word and bit 1 at the memory ROM output goes high and distant counter 2 is initialised. When decoder 30 and inverter 33 outputs are high, the read only memory output bits 2, 3 and 4 are predefined to take the values 1, 0, 1 and the fifth sector will subsequently be addressed. On the next frame, link L12 will output a signal of value 1. If bit 2 of input register 3 has the value 1 (link 20) indicating a confirmed realignment, read only memory will output bits 2, 3 and 4 having the values 1, 1, 1 and the sixth sector is addressed indicating an unconfirmed realignment. Otherwise the seventh sector is addressed.

When the sixth sector is addressed in an even-numbered frame (signal of value 0 on link 12) and if the frame alignment word is present (output of decoder 30 at 1 and output of inverter 33 at 1), read only memory outputs bits 2, 3 and 4 having the values 0, 0, 0 and the first sector, corresponding to the aligned state, is addressed. As long as no loss of frame alignment is detected, read only memory output bits 2, 3 and 4 retain the values 0, 0, 0 so that the first sector continues to be addressed.

If the frame alignment word is not recognised during an even-numbered frame while the sixth sector is addressed, read only memory outputs bits 2, 3 and 4 having the values 0, 0, 1 and the fourth sector is addressed to resume the search for the frame alignment word. If the seventh sector were addressed rather than the sixth sector, the seventh sector would continue to be addressed for one frame and then, as soon as the even-numbered frame were present, read only memory outputs bits 2, 3 and 4 having the values 0, 0, 1 to address the fourth sector to seek the frame alignment word.

If no even-numbered frame alignment word is detected when addressing the first sector, corresponding to the aligned state, the read only memory outputs bits 2, 3 and 4 showing the values 1, 0, 0 and the second sector is addressed. If the frame alignment word is detected in a subsequent even-numbered frame, read only memory outputs bits 2, 3 and 4 having the values 0, 0, 0 and the first sector is addressed. If the frame alignment word is not detected in the even-numbered frame, read only memory outputs bits 2, 3 and 4 having the values 0, 1, 0 and the third sector is addressed. If the frame alignment word is subsequently detected in an even-numbered frame, read only memory outputs bits 2, 3 and 4 having the values 0, 0, 0 and the first sector is addressed. If the frame alignment word is not detected in the even-numbered frame, read only memory outputs bits 2, 3 and 4 having the values 0, 0, 1 and the fourth sector is addressed to seek the frame alignment word.

It will be understood that sector addressing is based on the values of read only memory output bits 2, 3 and 4, and that the sector addressed is changed only if certain conditions are met. If these conditions are not met, the same sector continues to be addressed, but not necessarily the same word. For sector addressing to be effected correctly, it is therefore necessary for the bits of the addressed word in the sector to have certain values. Thus for the fourth sector bit 1 has the value 0 and bits 2, 3 and 4 the values 0, 0, 1, provided that the frame alignment word is not detected. If the frame alignment word is detected, the output of decoder 30 takes the value 1 and if bit 2 of register 3 has the value 0 the output of inverter 33 takes the value 1. This specifies a word address in the fourth sector. Bits 1, 2, 3 and 4 of this read only memory word have the values 1, 1, 0, 1. This initialises distant counter 2 and changes the sector as the values 1, 0, 1 of bits 2 3 and 4 correspond to addressing the fifth sector. Words of other sectors of the read only memory also provide for addressing the same sector as long as the word containing the address of a new sector is not addressed. In other words as long as the conditions for a change of sector are not satisfied the next memory location defined in part by bits 2, 3 and 4 will be in the same sector, provided that the output signal of unitary register 34 is at 0, except on switchover from the fourth to the fifth sector.

FIG. 3 shows the odd parity injection circuit of FIG. 1. It includes an exclusive-OR gate 45 with one input connected over link L13 to bit 3 of the input register and another input connected to the output of a unitary register 51. The output of exclusive-OR gate 45 is connected to one input of an AND gate 46 with another input connected through an inverter 47 to the output of an AND gate 48. One input of AND gate 48 receives signal wd and another input is connected over link L14 to bits 1 to 8 of the distant counter. Another input is connected through an inverter 56 and over link L15 to bit 9 of the distant counter. The output of AND gate 46 is connected to one input of an OR gate 50 which has another input connected to the output of AND gate 49. One input of AND gate 49 is connected through an inverter 57 to the output of inverter 47. Another input receives over link L22 a signal which is continuously at the value 1.

The output of OR gate 50 is connected to the input of unitary register 51 which is controlled by signal w̄d. The output of unitary register 51 is connected to one input of an AND gate 54 which has another input connected through an inverter 53 to the output of inverter 47. The output of AND gate 54 is connected to one input of an OR gate 55 which has another input connected to the output of an AND gate 52.

One input of AND gate 52 is connected to link L13 and receives bit 3 of the input register. Another input is connected to the output of inverter 47. The output of OR gate 55 is connected to link L16.

As long as the output of AND gate 48 has the value 0 and the output of inverter 47 has the value 1, with link L13 connected to bit 3 of input register 3 and AND gate 52 receiving a 1 from inverter 47, the value of bit 3 of the input register is transmitted through AND gate 52, OR gate 55 and link L16 to AND gate 11 (FIG. 1). AND gate 46 receives the signal 1 from inverter 47. As soon as bit 3 of the input register has the value 1, exclusive-OR gate 45 applies a 0 value to AND gate 46 and, through OR gate 50, to unitary register 51 when the output of the latter has the value 1, the value imposed at the start of the sequence by AND gate 49 through OR gate 50. This 0 value is thus applied to the input of exclusive-OR gate 45 when signal wd goes to the value 1.

When bit 3 (link L13) has the value 1, exclusive-OR gate 45 outputs a 1 and the unitary register 51 takes the value 1. As soon as bit 3 takes the value 0 again, the unitary register takes the value 0. The same operation applies, according to the values of bit 3 of the input register. When distant counter 2 has counter 256 bits, the output of AND gate 48 goes to 1 (signal wd), which closes AND gates 46 and 52 and opens AND gates 49 and 54. The output of unitary register 51 has the value 0 or 1, this value being transmitted through AND gate 54, or gate 55 and link L16 to AND gate 11 (FIG. 1). Thus bit 3 of input register 3 is transmitted to memory 8 (FIG. 1), except at the start of an odd-numbered frame when the output value of unitary register 51 is transmitted instead. Bit 3 of input register 3 corresponds to the second bit of the first time slot of an odd-numbered frame. The odd parity injection circuit thus determines the value to be taken by the second bit of the first time slot of the odd-numbered frame such that this bit and the preceding 511 bits comprise an odd number of bits with the value 1.

FIG. 4 shows the write time select circuit 4 of FIG. 1. A 2-bit series/parallel register 60 has its input connected over link L1 to bit 2 of the distant counter. Its output is connected to the input of a decoder 61 whose output is connected through an inverter 62 to one input of an AND gate 63. The output of AND gate 63 is connected to link L3. AND gate 63 has another input connected to link L2 through an inverter 66 and another input receiving signal $\overline{w}$. Series/parallel register 60 has its control input connected to the output of an AND gate 65, gate 65 having one input receiving signal $\overline{w}$ and another input connected over link L2 to bit 1 of the local counter.

The signal provided by bit 1 of the local counter is the first order submultiple of signal w, designated $\Omega 1$. AND gate 65 thus applies a control signal $\overline{w}.\Omega 1$ to series/parallel register 60, the input of which receives signal $\Omega d(2)$ which is the second order submultiple of distant signal $\overline{w}d$. Decoder 61 only outputs a signal when the decoded output of the series/parallel register is other than 2. AND gate 63 receives signals $\overline{w}$ and $\overline{\Omega 1}$. It outputs a signal when these two signals have the value 1 and the output signal of decoder 61 has the value 0.

Series/parallel register 60 is controlled by signal $\overline{w}.\Omega 1$, which is shifted by one half-period of signal $\Omega 1$ relative to signal $\overline{w}.\overline{\Omega 1}$ input to AND gate 63. Changes in the output signal of the decoder, associated with signal $\Omega d(2)$, thus occur before or after signal $\overline{w}.\overline{\Omega 1}$ input to AND gate 63, the output signal of which controls write operations in memory 8 over link L3. There are two possible write times for each signal $\Omega d(2)$, the local and distant clocks having very similar periods. If signal $\Omega d(2)$ is shifted relative to signal $\Omega 2$ (second order submultiple of signal w: distant clock faster or slower than local clock), transitions in signal $\Omega d(2)$ will occur at a certain time at which writing is possible. As decoder 61 outputs a signal only if the decoded output of series/parallel register 60 is other than 2, the write time corresponding to a change in signal $\Omega d(2)$ from value 1 to value 0 is suppressed. This transition corresponds to a write operation in register 7 (FIG. 1) and the samples present at the input of memory 8 would be unstable if writing occurred at this time.

FIG. 5 shows the decision circuit 5 of FIG. 1. A decoder 69 has its input connected over link L4 to bits 5 to 9 of distant counter 2. The decoder 69 decodes two addresses: 0 and 31. Address 0 is present at the decoder output during 16 bits (2 time slots each of 8 bits), ie during reading of words 0, 1, 2 and 3 of memory 8 (FIG. 1). Address 31 is present at the decoder output for 16 bits (reading of words 124, 125, 126 and 127 of memory 8). The decoder outputs (addresses 0 and 31) are connected to one input of an OR gate 70, the output of which is connected to one input of an AND gate 71. Another input of AND gate 71 is connected to the output of write time select circuit 4 over link L3, through inverter 64. The output of AND gate 71 is connected to the input of a unitary register 72. The output of register 72 is connected to one input of an AND gate 74. Another AND gate 75 receives a signal on one input which is continuously in the 1 state. Another input of AND gate 75 is connected through an inverter 76 to another input of AND gate 74. AND gates 74 and 75 have their outputs connected to respective inputs of an OR gate 77. The output of OR gate 77 is connected to one input of an AND gate 78 with another input connected through an inverter 79 to the output of an AND gate 80. AND gate 80 receives signal $\overline{w}$ on one input and has another input connected over link L5 to bits 1 to 8 of local counter 1. The output of AND gate 78 is connected to a unitary register 81, the output of which is connected to a control input of decoder 70 and to inverter 76 and, over link L6, to AND gate 20 (FIG. 1). The output signal of unitary register 81 is used, when addressing memory 8 through AND gate 20, as a most significant bit (bit 9) signal relative to the signals from bits 3 to 8 of the local counter input to said AND gate 20. This signal is used to address the first or second half of the memory corresponding to a complete frame. When bits 1 to 8 (link L5) of local counter 1 have the value 1 when signal $\overline{w}$ has the value 1, the output signal of AND gate 80 has the value 1. When this output signal goes from the value 1 to the value 0, AND gate 78 is activated. With AND gate 75 open, assuming that the output of unitary register is at 0, the value 1 is written into unitary register 81. The output signal of unitary register 81 activates decoder 69 and AND gate 74 and closes AND gate 75. Over link L6 it commands a read operation in the second half of memory 8.

Addresses 0 and 31 are only present at the output of decoder 69 during the time taken to count 16 bits. At the end of the write operation in memory 8 (FIG. 1), address 31 is first decoded, followed by address 0. The output signal of OR gate 70 is present, in total, during the counting of 32 bits only, and this signal is written into register 72 when the signal on link L3 goes from the value 1 to the 0. When local counter 1 stops counting words of memory 8, bits 1 to 8 of this counter have the value 1 and AND gate 78 is again activated on the 1-0 transition of the output signal of AND gate 80. There are then two possible outcomes. In the first case decoder 69 does not have address 0 or address 31 at its output. Register 72 therefore outputs a signal 0 which is applied to the input of AND gate 78. On activation of AND gate 78 unitary register 81 is reset to 0 to permit addressing of the first half of memory 8, link L6 carrying a signal 0. In the second case the decoder output carries address 0 or address 31 when AND gate 78 is activated. AND gate 78 thus receives a signal 1 from register 72 and unitary register 81 remains at the value 1. Link L6 carries a signal 1 commanding a read operation in the second half of memory 8, corresponding to a frame skip or frame repetition, according to whether the local clock is slower or faster than the distant clock.

The operation of the synchronising device shown in FIG. 1 will now be described, on the assumption that the frame alignment word has been detected. Data on incoming multiplex M is written into input register 3 under the control of signal $\overline{w}d$. This data is transferred into register 7 under the control of signal $\Omega d(2)$ from distant counter 2. Data is transferred from register 7 to memory 8 under the control of the output signal of write time select circuit 4. Memory 8 is addressed in write mode by the distant counter, AND gate 19 receiving over link L7 the addresses (bits 3 to 9) of the 4-bit memory words. This addressing mode applies when the output signal of AND gate 23 has the value 0, in other words when the write time select circuit outputs a signal and during the half-periods of signal $\Omega 1$ in which this signal has the value 0. Inverter 21 inhibits addressing in read mode during addressing in write mode of memory 8. AND gate 20 is used for addressing in read mode, through the intermediary of the local counter. It receives bits 3 to 8 of the local counter over link L8.

AND gate 20 also receives from decision circuit 5 a "most significant" signal which, in conjunction with bits 3 to 8 of the local counter, enables all of memory 8 to be addressed. As indicated in the description of the decision circuit, the decision circuit output signal provides for normal read operations in the memory and, when the relative shift of the distant and local clocks is less than or equal to 2 time slots, imposes readout of words 64 to 117 as soon as the last memory word has been read. This results in a frame skip if the distant clock is faster than the local clock, or a frame repetition if the distant clock is slower than the local clock. The data read from memory 8 is loaded in parallel into output register 9 under the control of signal Ω2, on 1-0 transitions of this signal. The data is then transmitted serially over multiplex M1.

Throughout this specification and claims the term odd parity has been used, since that corresponds to the preferred embodiment. Naturally even parity could be used instead with suitable modifications to the circuits.

We claim:

1. A device for synchronising multiplex lines in a time-division exchange, the multiplex lines conveying PCM encoded signals arranged in time slots grouped into frames, the device comprising:
   a local counter with a counting capacity equal to the number of bits in a frame, controlled by a local clock signal;
   a distant counter with a counting capacity equal to the sum of the number of bits of two distant frames, controlled by an inverted distant clock signal representative of timing of said conveyed encoded signals;
   an input register;
   a parallel register connected to the output of the input register and receiving data in parallel from said input register;
   an output register;
   a memory with a storage capacity of two distant frames with its input connected to the output of said parallel register through a write AND gate and its output connected to the output register through a read AND gate;
   an addressing circuit for memory write and read operations, having its input connected to the local counter which outputs the read addresses and to the distant counter which outputs the write addresses, the addressing circuit output being connected to a memory addressing control input;
   a write time select circuit for selecting write times and having an input connected to the local counter and to the distant counter and an output connected to the memory addressing circuit and to said write AND gate;
   a decision circuit for detecting any relative shift in the values output by the local and distant counters of less than a predetermined value, the decision circuit responding by imposing readout of a second frame in memory, said decision circuit having its input connected to the local counter, to the distant counter and to the output of the write time select circuit, and having an output connected to an input of the memory addressing circuit; and
   a frame alignment circuit for detecting and checking an identification code known as the multiplex frame alignment word and for initialising the distance counter on detection of the frame alignment word, the frame alignment circuit having an input connected to the distant counter and the input register and an output connected to the input of the distant counter.

2. A synchronising device according to claim 1, wherein the capacity of the memory is 128 words each of four bits, and the capacities of the parallel register and the output register are each four bits, bits in the input register being transferred in parallel in groups of four bits into the parallel register, the write time select circuit outputting at least one signal between successive transfers of four bits from (a) the input register to (b) the parallel register, the addressing circuit outputting a write address and a read address between said transfers.

3. A synchronising device according to claim 1, wherein the write time select circuit comprises: a 2-bit series/parallel register receiving from the distant counter a signal which is the distant clock signal divided by four and controlled by (i) the inverted local clock signal and (ii) a signal which is the local clock signal divided by two provided by the local counter; a decoder which outputs a signal when the decoded output of said series/parallel register is other than 2; and a write time select AND gate which outputs a signal when (i) the inverted clock signal, (ii) the inversion of said signal which is the local clock signal divided by two and (iii) the inverted decoder output signal have the value 1, said signal output by the write time select AND gate constituting the output signal of the write time select circuit.

4. A synchronising device according to claim 1, wherein the decision circuit comprises a decoder connected to the output of (i) the distant counter and (ii) a unitary register, the decoder outputting a signal during a last and a penultimate time slot stored in the memory and a first and a second time slot stored in the memory, the unitary register receiving a signal of value 1 when (i) the local counter has counted the bits of a first frame in the memory and (ii) the output signal of the decoder has a value 1 when the local counter has counted the bits of a second frame in memory, said unitary register outputting a signal which enables addressing of the first frame in the memory if it has the value 0 and addressing of the second frame in the memory if it has the value 1.

5. A synchronising device according to claim 1, wherein the frame alignment circuit comprises an address decoder connected to the output of the input register, a read only memory comprising eight sectors each of 16 words each of four bits, seven of which sectors are used, the three most significant bits of the read only memory being connected to a three-bit register having an output connected to a read only memory addressing circuit, the least significant bit of said read only memory being connected to a unitary register to initialize the distant counter, the read only memory addressing circuit being also connected (i) to the address decoder, (ii) to one bit of the input register and (iii) to the distant counter from which it receives a first signal when the counter is counting an odd-numbered frame and a second signal when the counter has terminated the counting of a frame, the most significant bits of the read only memory address defining a sector address and the addressing circuit being connected to links defining a word in a sector, the seven sectors used corresponding to the various states of the frame alignment circuit.

6. A synchronising device according to claim 1, wherein the frame alignment circuit comprises an odd parity injection circuit which is connected to one bit of the input register and receives from the distant counter a signal when said counter switches from an even-numbered frame to an odd-numbered frame, the value of the input register bit being transferred to the memory through the intermediary of a first AND gate and an OR gate in said odd parity injection circuit, said first AND gate being enabled except during switchover from an even-numbered to an odd-numbered frame, the parity injection circuit having a unitary register having its output connected to one input of an exclusive-OR gate, the other input of the exclusive-OR gate being connected to the input register bit, the unitary register receiving the output signal of the exclusive-OR gate except during switchover from an even-numbered to an odd-numbered frame, during which time it receives a signal of value 1, the unitary register having its output connected to one input of a second AND gate having its output connected to said OR gate, said second AND gate being enabled through an inverter during the switchover to transfer the value of the unitary register prior to said switchover to said OR gate, said value of the unitary register being transmitted by said OR gate in lieu of the value of the bit received by said first AND gate which is inhibited on the switchover, the value of the unitary register applied to the second AND gate constituting, along with the preceding values of the input register transmitted by the first AND gate, a group in which the number of bits at 1 for two consecutive frames is odd.

* * * * *